(12) United States Patent
Lien et al.

(10) Patent No.: US 7,586,911 B2
(45) Date of Patent: Sep. 8, 2009

(54) METHOD AND APPARATUS FOR PACKET TRANSMIT QUEUE CONTROL

(75) Inventors: Wei-han Lien, San Jose, CA (US); Brian Hang Wai Yang, Monterey Park, CA (US); Sridhar Subramanian, Sunnyvale, CA (US)

(73) Assignee: RMI Corporation, Cupertino, CA (US)

( * ) Notice: Subject to any disclaimer, the term of this patent is extended or adjusted under 35 U.S.C. 154(b) by 1157 days.

(21) Appl. No.: 10/687,786

(22) Filed: Oct. 17, 2003

(65) Prior Publication Data
US 2005/0083927 A1    Apr. 21, 2005

(51) Int. Cl.
*H04L 12/56* (2006.01)
(52) U.S. Cl. ...................................... 370/389
(58) Field of Classification Search ................... 370/389
See application file for complete search history.

(56) References Cited

U.S. PATENT DOCUMENTS

| | | | | |
|---|---|---|---|---|
| 5,895,687 A | * | 4/1999 | Kondo et al. ................. | 427/420 |
| 5,898,687 A | * | 4/1999 | Harriman et al. ............. | 370/390 |
| 6,212,182 B1 | * | 4/2001 | McKeown ................... | 370/390 |
| 6,711,153 B1 | * | 3/2004 | Hebb et al. .................. | 370/351 |
| 6,958,973 B1 | * | 10/2005 | Chen et al. .................. | 370/235 |
| 7,016,349 B1 | * | 3/2006 | Raza et al. ................... | 370/390 |
| 7,106,693 B1 | * | 9/2006 | Turner et al. ................. | 370/230 |

\* cited by examiner

*Primary Examiner*—Henry W. H. Tsai
*Assistant Examiner*—John B Roche
(74) *Attorney, Agent, or Firm*—Zilka-Kotab, PC (57) ABSTRACT

A packet transmit queue control system including a first data structure, a second data structure, a packet controller, and a port transmit controller is disclosed. The first data structure can include a plurality of linked-list data structures and can store unicast type packet pointers. The second data structure can include a plurality of first-in first-out (FIFO) structures and can store multicast type packet pointers. The packet controller can receive a first sequence of unicast and/or multicast type packets. The port transmit controller can provide a second sequence of the unicast and/or multicast type packets. Further, each of the plurality of FIFO structures can correspond to an output port of the system.

27 Claims, 8 Drawing Sheets

FIG. 1 (conventional)

FIG. 2 (conventional)

FIG. 3 (conventional)

FIG. 4 (conventional)

METHOD AND APPARATUS FOR PACKET TRANSMIT QUEUE CONTROL

FIELD

The invention relates generally to the field of networking and, more particularly, to packet transmit queue control for multicasting of packets at line rate.

BACKGROUND

In networking systems, routers and/or switches typically move packets of information from one of a number of input ports to one or more output ports. In some applications, a packet may need to be duplicated on multiple output ports. A "unicast" type packet is intended for only one output port while a "multicast" type packet is intended for multiple output ports. Modern systems must be able to handle both of these packet types. Control of the sequence/flow of such packets for an output port can present a number of system design challenges and result in system limitations, as will be discussed in more detail below with reference to FIGS. 2-4.

Figure 1:
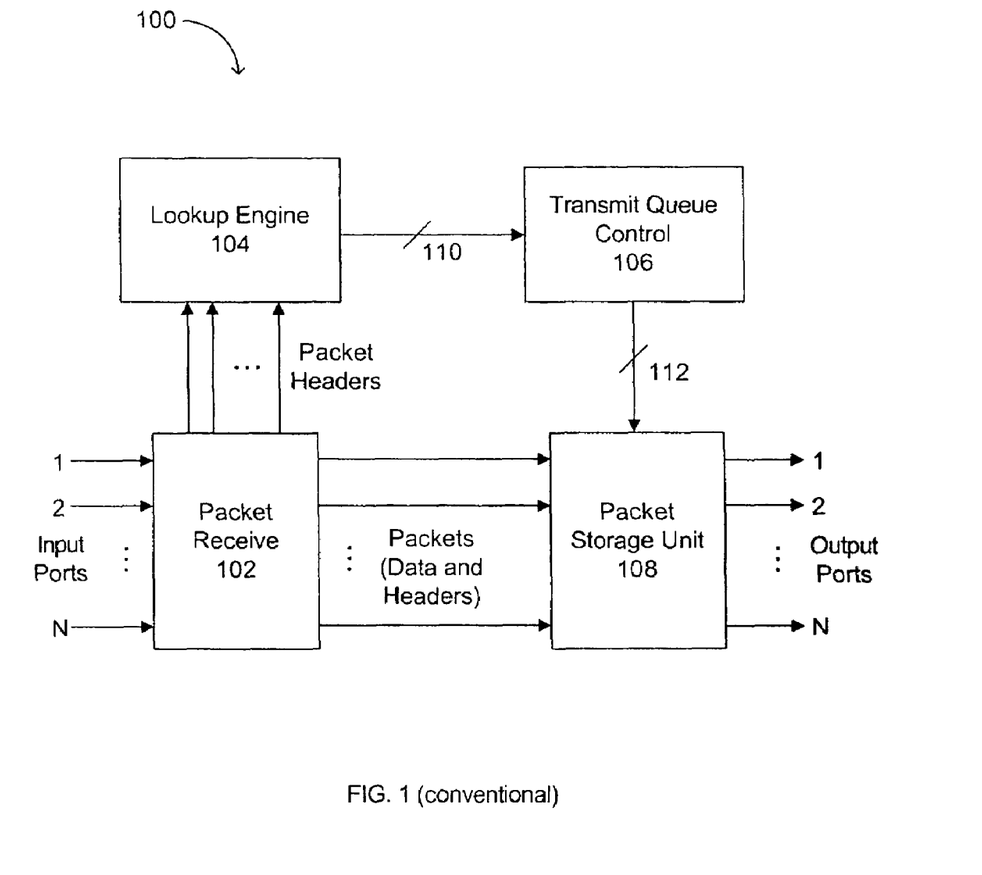
FIG. 1 is a block diagram of a conventional router/switch system arrangement.

Referring now to FIG. 1, a block diagram of a conventional router/switch system arrangement is shown and indicated by the general reference character 100. Input Ports 1, 2, ... N can connect to Packet Receive 102, which can send Packet Headers to Lookup Engine 104 and Packets (Data and Headers) to Packet Storage Unit 108. The packet storage unit can store the packet data and the locations of this packet data can be identified by packet "pointers." Typically, only one copy of the packet data may be stored in the packet storage unit regardless of the packet type (e.g., unicast or multicast). Lookup Engine 104 can provide signals 10 to Transmit Queue Control 106. Signals 110 can include a packet type indication (e.g., unicast or multicast), a transmit port number, and/or a packet pointer, for example. Further, the packet type information can also include a known Media Access Control Destination Address (MACDA) or an unknown MACDA, which may indicate a "flooding" operation is to be performed. Generally speaking, "flooding" means to transmit a packet to all output ports except the incoming port. Such a packet may still be considered a multicast type of packet. Flooding can ensure that a packet will reach its intended destination, even though its MACDA is not known. Transmit Queue Control 106 can provide signals 112 to Packet Storage Unit 108, which can store data and control the selections to Output Ports 1, 2, ... N. Signals 112 can include information such as a transmit enable, a packet pointer, and/or a transmit port number. In other words, Transmit Queue Control 106 can "schedule" or set an order of the packets to be transmitted for each output port in the system by indicating the packet pointer in signals 112. Next, three different conventional approaches to providing this control function will be described, along with drawbacks of each.

Figure 2:
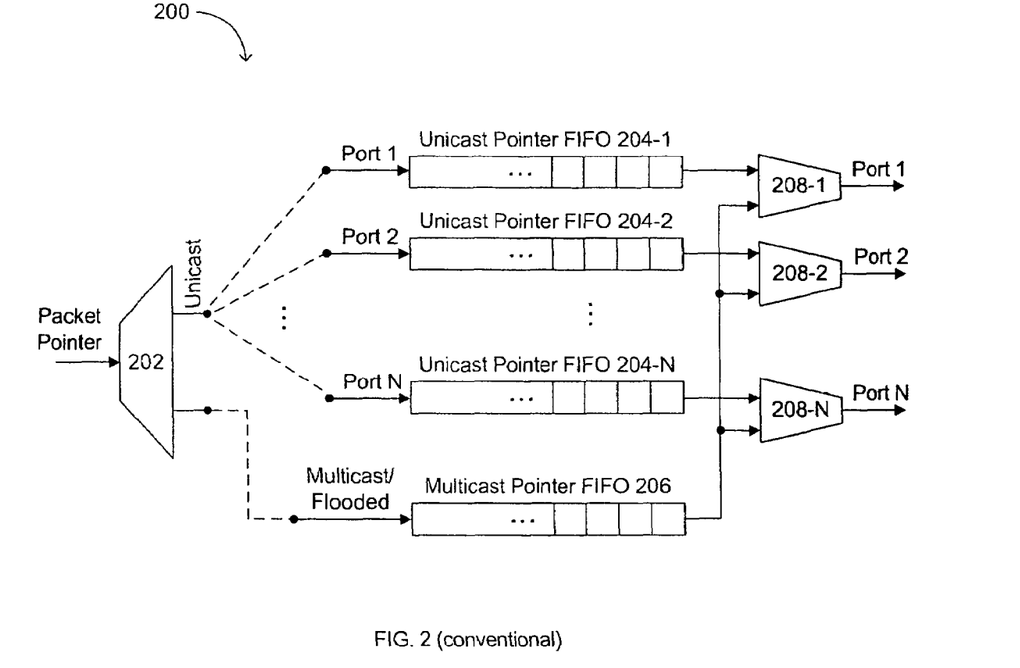
FIG. 2 is a block diagram of a conventional single multicast queue system.

Referring now to FIG. 2, a block diagram of a conventional single multicast queue system is shown and indicated by the general reference character 200. This system contains a separate pointer first-in first-out (FIFO) structure for multicast type packets. A Packet Pointer can be received by controller 202, which can determine, for example, if the packet is unicast or multicast type. If Unicast, the packet can be sent to one of Unicast Pointer FIFO 204-1, 204-2, ... 204-N, which each corresponding to Port 1, Port 2, ... Port N, respectively. If Multicast/Flooded (i.e., if the packet is multicast type or the MACDA is unknown), the packet can be sent to Multicast Pointer FIFO 206. An output of Multicast Pointer FIFO 206 can connect to each of de-queue controllers 208-1, 208-2, ... 208-N, one for each output port. Disadvantages of this approach include misordering of unicast frames and head-of-line (HOL) blocking. The misordering results from unicast and multicast/flooding packets not being queued together and this can be especially problematic for Ethernet switches. The HOL flooding problem causes unnecessary starvation of uncongested output ports due to a few congested output ports.

Figure 3:
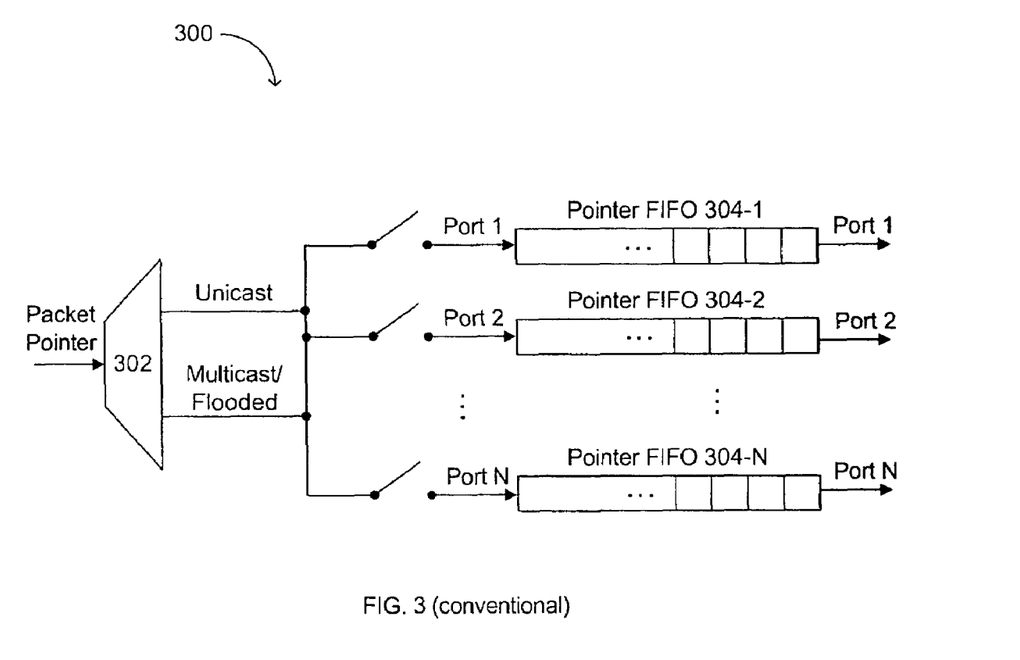
FIG. 3 is a block diagram of a conventional "N" multicast queue system.

Referring now to FIG. 3, a block diagram of a conventional "N" multicast queue system is shown and indicated by the general reference character 300. This system does not have a dedicated multicast queue, as each port has its own FIFO structure. A Packet Pointer can be received by controller 302 and passed to one of Pointer FIFO 304-1, 304-2, ... 304-N for a Unicast determination (i.e., a unicast type packet). If Multicast/Flooded, each of the Pointer FIFOs that is a member of the associated multicast group receives the pointer. Disadvantages of this approach include a high memory bandwidth requirement and difficulty with queue re-sizing and/or excessive memory space requirements.

Figure 4:
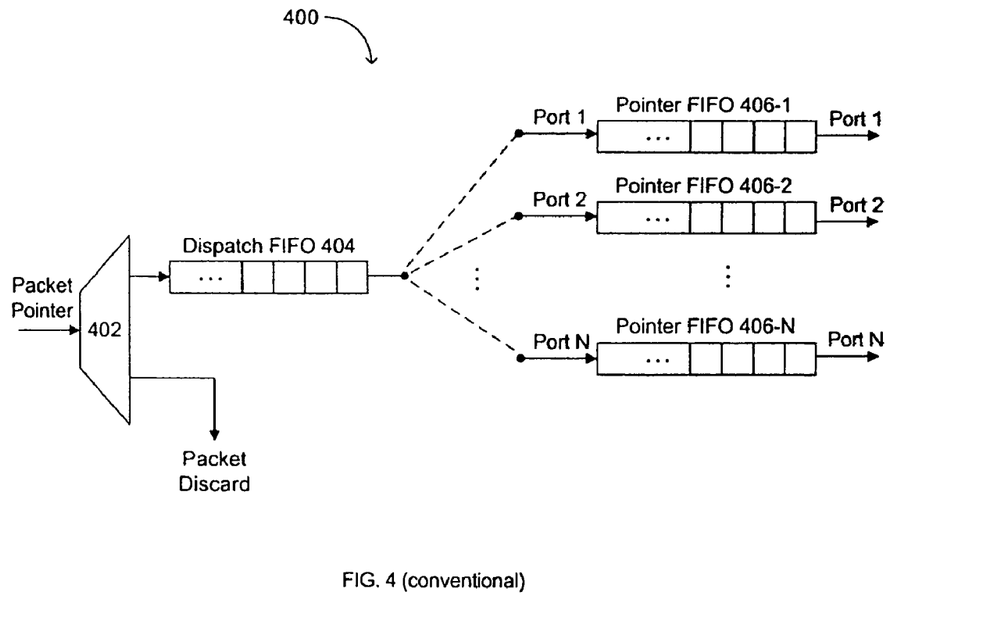
FIG. 4 is a block diagram of a conventional dispatch first-in first-out (FIFO) system.

Referring now to FIG. 4, a block diagram of a conventional dispatch first-in first-out (FIFO) system is shown and indicated by the general reference character 400. A Packet Pointer can be received by controller 402 and then sent to either Dispatch FIFO 404 or to Packet Discard (if the dispatch FIFO is full). The pointer can be routed from Dispatch FIFO 404 to one or more of Pointer FIFO 406-1, 406-2, ... 406-N, where each corresponds to a particular output port. Disadvantages of this approach include HOL blocking, unnecessary packet discard, and overall performance.

Consequently, what is needed is a transmit queue control solution with efficient pointer storage, prevention of multicast packets blocking unicast packets, line rate capable system performance, dynamic queue re-sizing, HOL blocking prevention, and strict packet ordering.

SUMMARY

The invention overcomes the identified limitations and provides a transmit queue control solution with efficient pointer storage and other advantageous features.

According to embodiments of the invention, a packet transmit queue control system includes a first data structure, a second data structure, a packet controller, and a port transmit controller. The first data structure can include a plurality of linked-list data structures and can store unicast type packet pointers. The second data structure can include a plurality of first-in first-out (FIFO) structures and can store multicast type packet pointers. The packet controller can receive a first sequence of unicast and/or multicast type packets. The port transmit controller can provide a second sequence of the unicast and/or multicast type packets. Further, each of the plurality of FIFO structures can correspond to a port.

According to another aspect of the invention, a data arrangement for packet transmit queue control includes a first data structure configured to store first type packet pointers, a second data structure configured to store second type packet pointers, and a third data structure configured to store a plurality of status flags. The first data structure can include a linked-list structure and the second data structure can include a first-in first-out (FIFO) structure. The first type packet pointers can include unicast pointers and the second type packet pointers can include multicast pointers. Also, each entry of the FIFO structure can include a previous unicast pointer indication field, a next unicast pointer indication field, a previous unicast pointer field, and a packet pointer field.

According to another aspect of the invention, a method of inserting a pointer can include determining if a pointer is a unicast pointer or multicast pointer. For a unicast type pointer, determining if an overall tail is unicast or multicast. If multicast, setting an overall tail is unicast flag and an entry to the yes-state. If unicast, or upon completion of the previous two steps for multicast, the method includes getting a unicast tail, linking the pointer in a linked-list data structure to the unicast tail, and setting the unicast tail to the pointer. For a multicast type pointer, the method includes determining if the overall tail is unicast or multicast. If multicast, adding the pointer to a FIFO structure field with a no-state. If unicast, adding the pointer to the FIFO structure field with a yes-state. Further, the method includes setting the overall tail is unicast flag to the no-state.

According to another aspect of the invention, a method of scheduling a packet pointer can include determining if an overall head is a unicast pointer or a multicast pointer. If unicast, the method can include getting a unicast head, getting the unicast pointer from the linked-list data structure, determining if the unicast head matches the unicast pointer, setting an overall head flag to a no-state if a match, and updating the unicast head with a next pointer from the linked-list data structure. If multicast, the method can include getting the multicast pointer from the FIFO data structure, determining if a field in the FIFO structure is a yes-state or a no-state, setting the overall head flag to the yes-state if a yes-state, and removing a head entry from the FIFO data structure.

Advantages of the invention include efficient pointer storage, the prevention of multicast packets blocking unicast packets, line rate capable system performance, dynamic queue re-sizing, head-of-line (HOL) blocking prevention, and strict packet ordering.

BRIEF DESCRIPTION OF THE FIGURES

Embodiments of the invention are described with reference to the FIGS, in which.

DETAILED DESCRIPTION

Embodiments of the invention are described with reference to specific diagrams depicting system arrangements and methods. Those skilled in the art will recognize that the description is for illustration and to provide the best mode of practicing the invention. The description is not meant to be limiting. For example, reference is made to packet types, such as unicast and multicast, but the invention is applicable to other types of packets and/or systems as well. Further, pointers, linked-lists and/or first-in first-out (FIFO) data and/or storage structures, and numbers of ports and/or elements in a system merely provide example data structure implementations and should not be construed as limiting.

Figure 5:
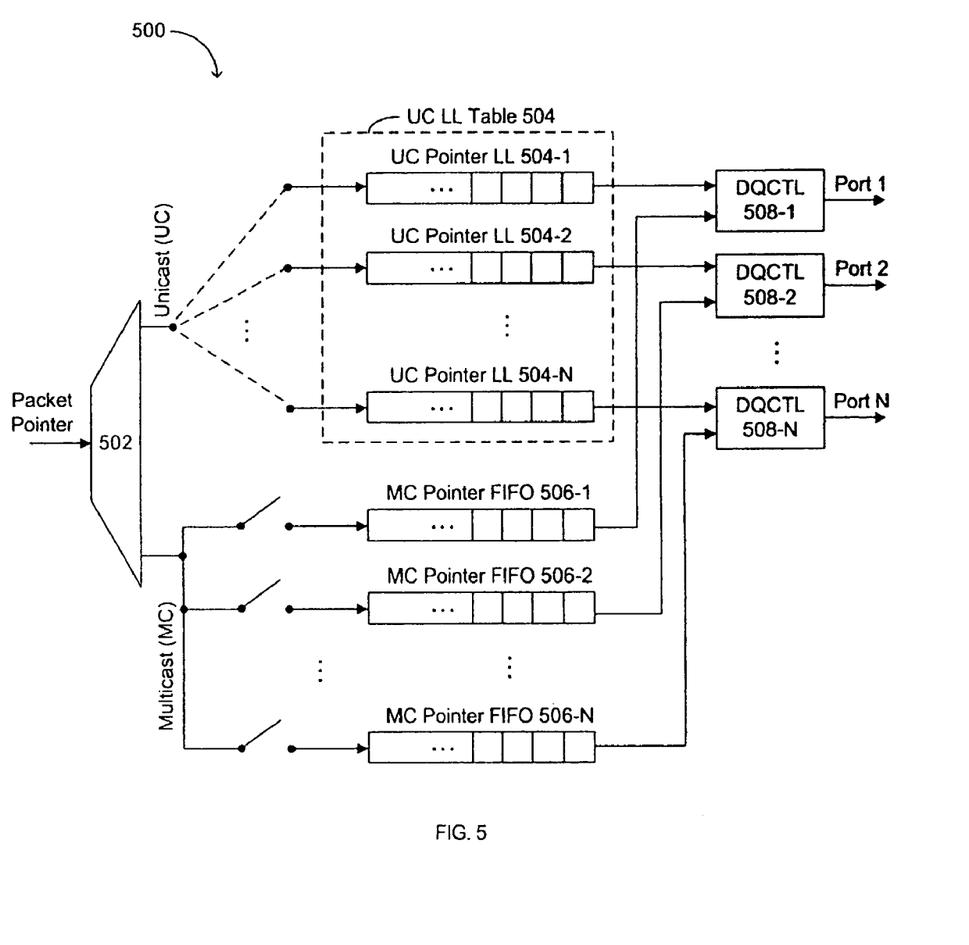
FIG. 5 is a block diagram of a transmit queue control system according to an embodiment of the invention.

Referring now to FIG. 5, a block diagram of a transmit queue control system according to an embodiment of the invention is shown and indicated by the general reference character 500. Such a transmit queue system may, as only one example, provide an improved implementation of Transmit Queue Control 106 of FIG. 1. Further, the system may maintain an ordering or provide scheduling information so that an output sequence is substantially consistent with a packet arrival order. In FIG. 5, a Packet Pointer can be received by packet controller 502. "Packet Pointer" can indicate one or a series or a sequence of packets of data. The packet controller can determine whether a packet is Unicast (UC) or Multicast (MC) type, for example. If the packet is a UC type, the packet pointer can be stored in a position in UC LL (linked-list) Table 504. UC LL Table 504 can include UC Pointer LL 504-1, 504-2, . . . 504-N. In one example, each of the UC Pointer linked-lists of UC LL Table 504 can correspond to an output port. In another example, each of the UC Pointer linked-lists of UC LL Table 504 can correspond to a tuple that includes a service class and an output port. Thus, UC Pointer 504-1 can correspond to Port 1, 504-2 to Port 2, and so on. If the packet is an MC type or if it can be "flooded," for example, the packet pointer can be sent from packet controller 502 to each or to a group of MC Pointer FIFO 506-1, 506-2, . . . 506-N. In one example, each pointer FIFO can correspond to an output port. A port transmit controller or de-queue controller (DQCTL) can be coupled to each output port. DQCTL 508-1 can control Port 1, DQCTL 508-2 can control Port 2, and so on through DQCTL 508-N controlling Port N. Further, each of the DQCTL blocks can receive one input from UC LL Table 504 and one input from one of MC Pointer FIFO 506-1 through 506-N.

Figure 6:
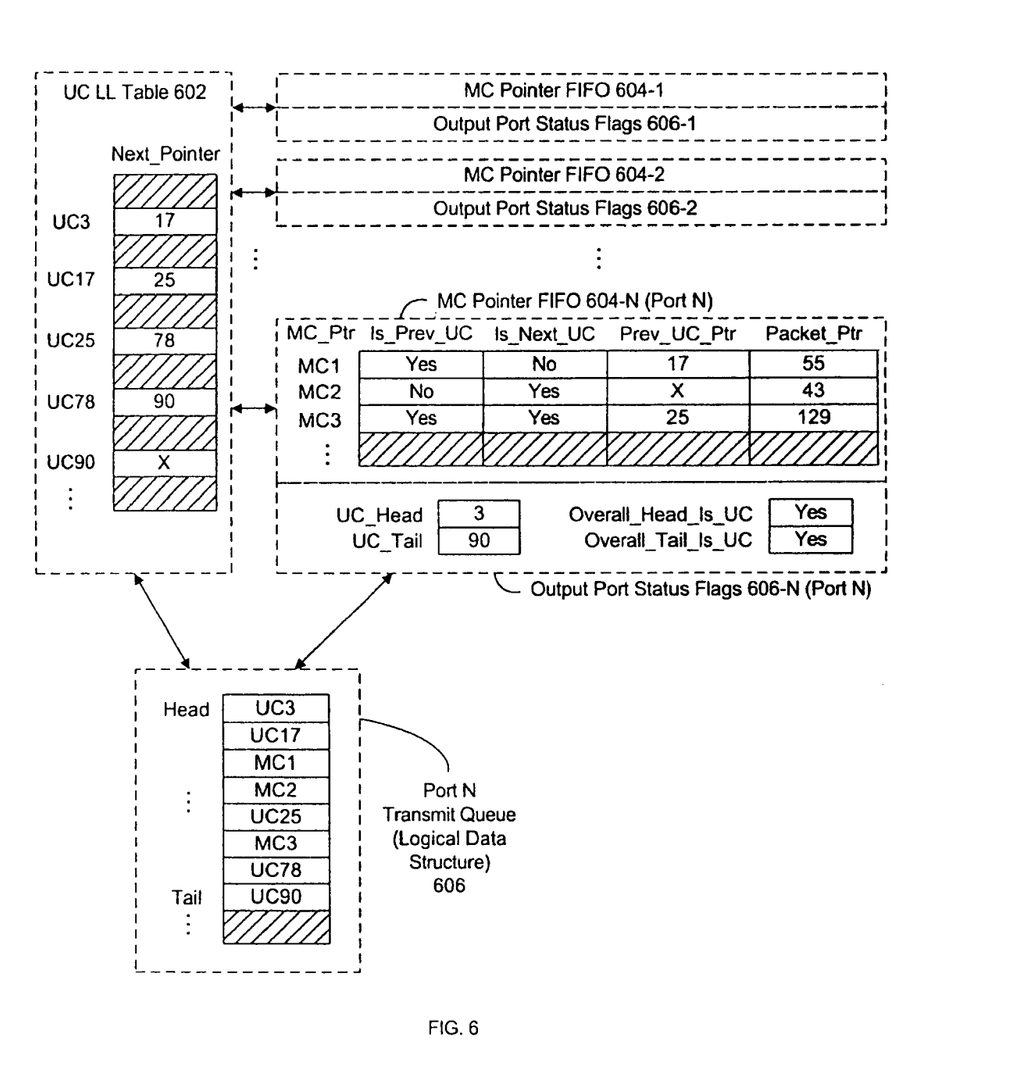
FIG. 6 is a diagram of a data structure arrangement suitable for transmit queue control according to an embodiment of the invention.

Referring now to FIG. 6, a diagram of a data structure arrangement suitable for transmit queue control according to an embodiment of the invention is shown and indicated by the general reference character 600. In this example, UC LL Table 602 may correspond to UC LL Table 504 of FIG. 5. Also, MC Pointer FIFO 604-1, 604-3, . . . 604-N may correspond to MC Pointer FIFO 506-1, 506-2, . . . 506-N of FIG. 5. In FIG. 6, a physical data structure arrangement as well as a logical (i.e., not suggestive of a physical arrangement) data structure arrangement for a transmit queue along with associated example values is shown. Accordingly, the operation of the system of FIG. 5 will be described in further detail by way of its associated data structures and the particular example case illustrated in FIG. 6. In FIG. 6, UC LL Table 602 can include a number of "linked" data structures. UC pointer UC3 can point to Next_Pointer 17, UC17 can point to Next Pointer 25, UC25 can point to Next_Pointer 78, UC78 can point to Next_Pointer 90, and UC90 can point to Next_Pointer X (i.e., a "don't care" term). Interfacing with UC LL Table 602 can be MC Pointer FIFO 604-1, 604-2, . . . 604-N, where each may correspond to a particular output port. Further, each of the MC Pointer FIFOs can be coupled with a corresponding set of Output Port Status Flags 606-1, 606-2, . . . 606-N, for each output port. In this example, MC Pointer FIFO 604-N may include a number of multicast pointers (MC_Ptr): MC1, MC2, MC3, etc. Each entry or pointer in an MC Pointer FIFO may include several fields, such as a previous unicast pointer indication field (Is_Prev_UC), a next unicast pointer indication field (Is_Next_UC), a previous unicast pointer field (Prev_UC_Ptr), and a packet pointer field (Packet_Ptr). The output port status flags can include UC_Head (e.g., 3), UC_Tail (e.g., 90), Overall_Head_Is_UC (e.g., "Yes"), and Overall_Tail_Is_UC (e.g., "Yes").

An example case of forming Port N Transmit Queue (Logical Data Structure) 606 in FIG. 6 will now be described. Starting with UC3, that pointer is inserted into Port N Transmit Queue 606 at the "Head" position. Because UC3 can point to 17, UC17 is next placed in the transmit queue. However, the Prev_UC_Ptr field of the leading MC_Ptr in the MC Pointer FIFO must also be checked. Such checking can be done in a continuous or periodic basis, depending on the system design. Here, the Prev_UC_Ptr field of MC1 matches "17" and "Is_Prev_UC" is "Yes." Accordingly, MC1 can be placed in the transmit queue. Because "Is_Next_UC" field is "No," the next pointer in the MC Pointer FIFO that can go in the transmit queue is also a multicast type pointer: MC2. Because the "Is_Next_UC" field for MC2 is "Yes," the next pointer to the transmit queue can be UC25, because that was the previous position in UC LL Table 602, as referenced by UC 17. In checking the Prev_UC_Ptr field in the MC Pointer FIFO, there is a match with "25" in the MC3 position, which now can be the in the leading position because MC1 and MC2 have already been placed in the transmit queue. MC3 can be placed in the transmit queue, but because the "Is_Next_UC" field is "Yes," the next pointer can come from UC LL Table 602. Here, the position pointed to by UC25 is 78. Accordingly, UC78 is placed in the transmit queue. Finally, with no references in the MC Pointer FIFO, UC90 can be placed in the transmit queue because it was referenced by UC78. While UC90 is shown in the "Tail" position of the transmit queue, this is a dynamic arrangement and the queue can grow or shrink according to system operation.

Figure 7:
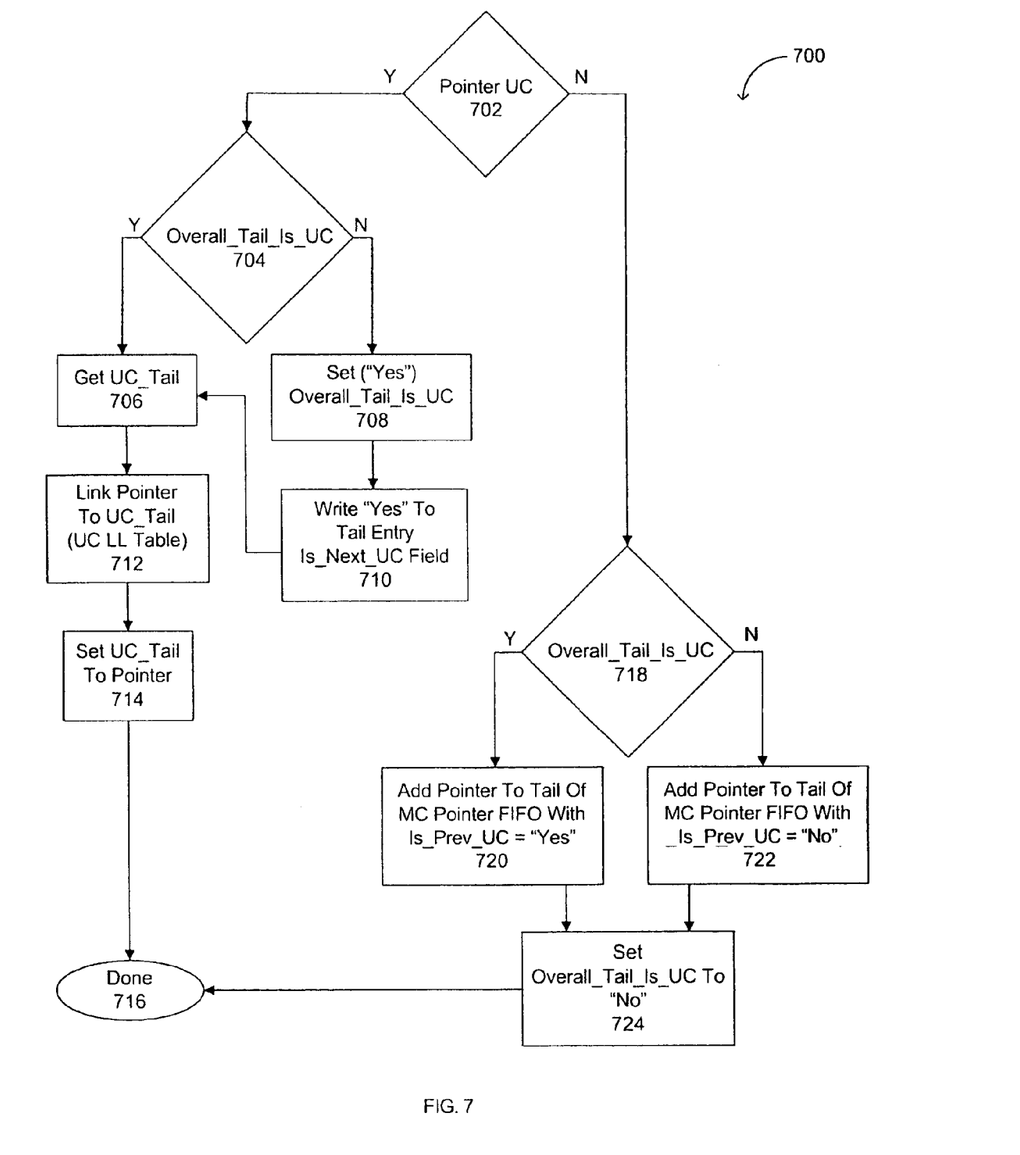
FIG. 7 is a flow diagram of a packet pointer insertion method according to an embodiment of the invention.

Referring now to FIG. 7, which will be described with reference to above FIGS, particularly FIG. 6, a flow diagram of a packet pointer insertion method according to an embodiment of the invention is shown and indicated by the general reference character 700. This flow may be executed multiple times in order to form an example data structure, such as that described above with reference to FIG. 6. While the flow of FIG. 7 may be executed once per destination port, for example, the multiple executions can occur in parallel fashion at substantially the same time. However, in one aspect of the embodiments, the pointer insertion can be done with only one access per data structure. Such an approach is superior to other methods requiring multiple accesses per pointer insertion, particularly for multicast packets. The flow can begin with decision box Pointer UC 702, which can determine whether the pointer points to a unicast (UC) or a multicast (MC) type packet. As one example, this task can be performed by a lookup engine, such as Lookup Engine 104 of FIG. 1.

In FIG. 7, if the pointer is unicast (UC), the flow can proceed to decision box Overall_Tail_Is_UC 704. This can include checking the Overall_Tail_Is_UC status flag, such as from Output Port Status Flags 606-N (Port N). If the overall tail is not UC type, the flow can proceed to step Set ("Yes") Overall_Tail_Is_UC 708 and then step Write "Yes" To Tail Entry Is_Next_UC Field 710 (e.g., in 604-N). Next, the flow can proceed to step Get UC_Tail 706, which can be from 606-N, for example. Step 706 also can accept the "Y" branch from decision box 704, discussed above. The flow can proceed from step 706 to step Link Pointer To UC_Tail (UC LL Table) 712. Next, the flow can proceed to step Set UC_Tail To Pointer 714 (e.g., in 606-N). From step 714, the flow can complete in Done 716.

In FIG. 7, if the pointer is multicast (MC), the flow can proceed to decision box Overall_Tail_Is_UC 718. This can include checking the Overall_Tail_Is_UC status flag, such as from Output Port Status Flags 606-N (Port N). If the overall tail is not UC type, the flow can proceed to step Add Pointer To Tail Of MC Pointer FIFO With Is_Prev_UC="No" 722. Next, the flow can proceed to step Set Overall_Tail_Is_UC To "No" 724 (e.g., in 606-N). If the overall tail is UC type, as determined in decision box 718, the flow can proceed to step Add Pointer To Tail Of MC Pointer FIFO With Is_Prev_UC="Yes" 720. Next, the flow can proceed to step 724 and then the flow can complete in Done 716.

Figure 8:
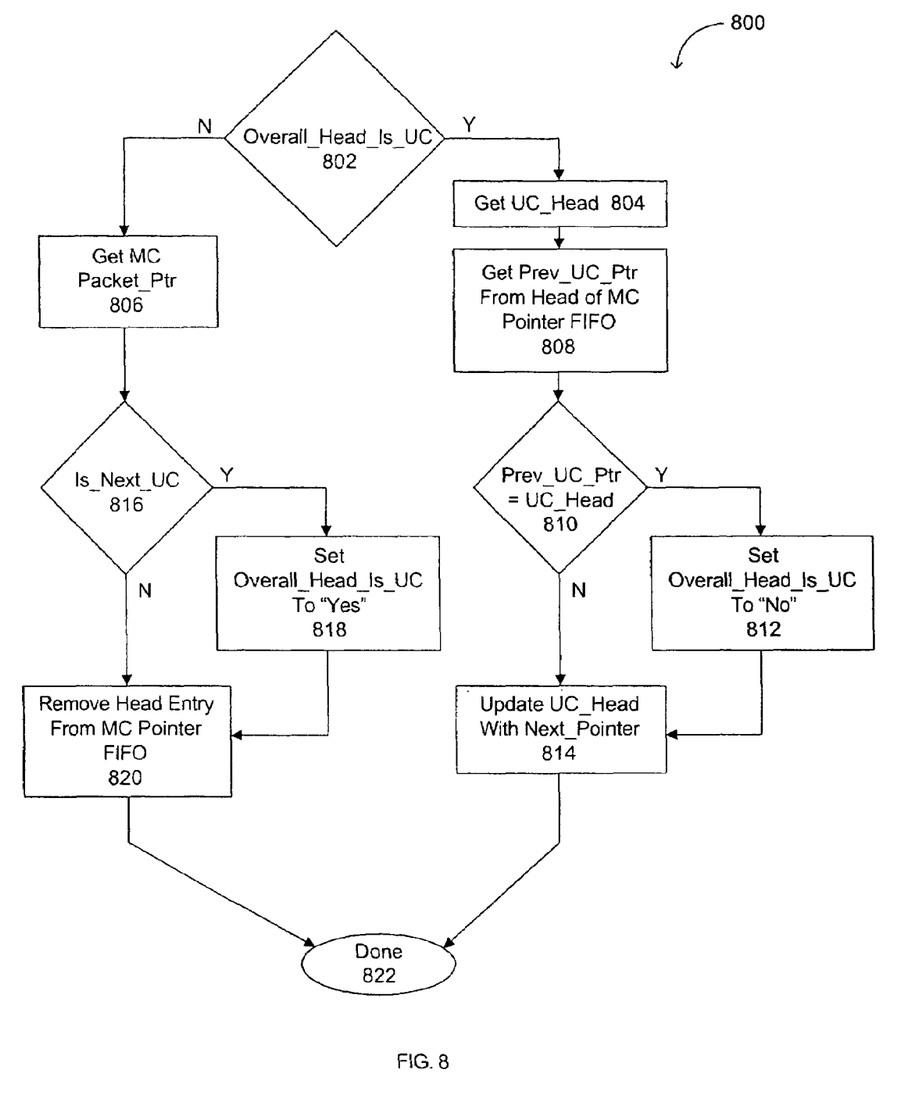
FIG. 8 is a flow diagram of a packet pointer scheduling method according to an embodiment of the invention.

Referring now to FIG. 8, a flow diagram of a packet pointer scheduling method according to an embodiment of the invention is shown and indicated by the general reference character 800. This diagram shows a flow for determining the next packet to be transmitted at output port N. In other words, the diagram represents a flow for scheduling a packet for an output port. In one aspect of the embodiments, the scheduling of pointers can be done with only one access per data structure. The flow will be described with reference to FIG. 6 for the data structures and FIG. 1 for the overall system relation.

In FIG. 8, the flow can begin with decision box Overall_Head_Is_UC 802, which can include a checking of the Output Port Status Flags 606-N. If the flag overall head is a unicast (UC) type (i.e., is "Yes"), the flow can proceed to step Get UC_Head 804. This step can include providing indication of the value of the UC_Head via signals 112 of FIG. 1, for example, so that this packet can be scheduled for transmission. Next, the flow can proceed to step Get Prev_UC_Ptr From Head of MC Pointer FIFO 808. This can allow a comparison shown in decision box 810. If Prev_UC_Ptr is equal to UC_Head, the flow can proceed to step Set Overall_Head_Is_UC To "No" 812. On the other hand, if Prev_UC_Ptr is not equal to UC_Head, the flow can proceed instead to step Update UC_Head With Next_Pointer 814. From step 814, the flow can complete in step Done 822.

The other main branch shown in FIG. 8 can be followed from decision box Overall_Head_Is_UC 802 if the overall head is a multicast (MC) type. In this branch, the flow can proceed from decision box 802 to step Get MC Packet_Ptr 806. This step can include providing indication of the value of the MC Packet_Ptr via signals 112 of FIG. 1, for example, so that this packet can be scheduled for transmission. Next, the flow can proceed to decision box Is_Next_UC 816. If the next pointer is unicast type, the flow can proceed to step Set Overall_Head_Is_UC To "Yes" 818. On the other hand, if the next pointer is multicast type, the flow can proceed instead to step Remove Head Entry From MC Pointer FIFO 820. From step 820, the flow can complete in step Done 822.

Advantages of the invention include providing for efficient pointer storage, preventing multicast packets from blocking unicast packets, support of system performance at line rate, dynamic queue re-sizing capability, preventing HOL blocking, and maintaining strict packet ordering for queue transmit control or other applications.

Having disclosed exemplary embodiments and the best mode, modifications and variations may be made to the disclosed embodiments while remaining within the subject and spirit of the invention as defined by the following claims.

The invention claimed is:

1. A packet transmit queue control system, comprising:
   a first data structure embodied on a tangible computer readable medium coupled to a packet controller and configured to store a plurality of first type packet pointers;
   a second data structure embodied on a tangible computer readable medium coupled to the packet controller and configured to store a plurality of second type packet pointers, wherein the packet controller is configured to receive a first sequence of packet pointers and to provide each packet pointer to one of the first and second data structures;
   a third data structure embodied on a tangible computer readable medium coupled to the second data structure and configured to store a plurality of status flags; and
   a port transmit controller coupled to the first and second data structures and configured to provide a second sequence of packet pointers;
   wherein the first data structure includes a plurality of linked-list data structures;
   wherein the plurality of status flags include:
      a first type packet pointer head position indication;
      a first type packet pointer tail position indication;
      an overall head pointer indication; and
      an overall tail pointer indication.

2. The packet transmit queue control system of claim 1, wherein:
   the second data structure includes a plurality of first-in first-out (FIFO) structures.

3. The packet transmit queue control system of claim 2, wherein:
   each of the plurality of FIFO structures is coupled to a port.
4. The packet transmit queue control system of claim 1, wherein:
   the first type packet pointers include unicast pointers; and
   the second type packet pointers include multicast pointers.
5. The packet transmit queue control system of claim 1, wherein:
   the second sequence of packet pointers includes port transmit scheduling information.
6. The packet transmit queue control system of claim 1, wherein:
   an ordering of the second sequence of packet pointers is substantially consistent with a packet arrival order.
7. The packet transmit queue control system of claim 3, wherein:
   the packet controller is configured to provide:
      each of the plurality of first type packet pointers to a selected one of the plurality of linked-list data structures; and
      each of the plurality of second type packet pointers to each of a group of the plurality of FIFO structures.
8. A data arrangement for packet transmit queue control, comprising:
   a first data structure embodied on a tangible computer readable medium configured to store a plurality of first type packet pointers;
   a second data structure embodied on a tangible computer readable medium configured to store a plurality of second type packet pointers; and
   a third data structure embodied on a tangible computer readable medium coupled to the second data structure and configured to store a plurality of status flags;
   wherein the first data structure includes a linked-list structure;
   wherein the plurality of status flags include:
      a first type packet pointer head position indication;
      a first type packet pointer tail position indication;
      an overall head pointer indication; and
      an overall tail pointer indication.
9. The data arrangement for packet transmit queue control of claim 8, wherein:
   the second data structure includes a first-in first-out (FIFO) structure.
10. The data arrangement for packet transmit queue control of claim 8, wherein:
   the first type packet pointers include unicast pointers; and
   the second type packet pointers include multicast pointers.
11. The data arrangement for packet transmit queue control of claim 10, wherein:
   each entry of the second data structure includes:
      a previous unicast pointer indication field;
      a next unicast pointer indication field;
      a previous unicast pointer field; and
      a packet pointer field.
12. A method of inserting a packet pointer in a packet queue control system, comprising:
   (a) determining if a pointer is a first type or a second type;
   (b) if die pointer is the first type, determining if an overall tail is the first type or the second type;
      if the overall tail is the second type, setting an overall tail flag to a first state, and setting an entry to the first state;
      getting a first type tail;
      linking the pointer in a first data structure to the first type tail; and
      setting the first type tail to the pointer; and
   (c) if the pointer is the second type, determining if the overall tail is the first type or the second type;
      if the overall tail is the second type, adding the pointer to a second data structure field with a second state;
      if the overall tail is the first type, adding the pointer to the second data structure field with the first state; and
      setting the overall tail flag to the second state;
   wherein the first data structure includes a plurality of linked-list data structures;
   wherein a third data structure is coupled to the second data structure and is configured to store a plurality of status flags;
   wherein the plurality of status flags include:
      a first type packet pointer head position indication;
      a first type packet pointer tail position indication;
      an overall head pointer indication; and
      an overall tail pointer indication.
13. The method of inserting the packet pointer in the packet queue control system of claim 12, wherein:
   the second data structure includes a first-in first-out (FIFO) data structure.
14. The method of inserting the packet pointer in the packet queue control system of claim 12, wherein:
   the first type pointer includes a unicast packet pointer; and
   the second type pointer includes a multicast packet pointer.
15. The method of inserting the packet pointer in the packet queue control system of claim 12, wherein:
   the first state includes a yes-state; and
   the second state includes a no-state.
16. The method of inserting the packet pointer in the packet queue control system of claim 12, wherein:
   the first data structure is accessed at most once; and
   the second data structure is accessed at most once.
17. A means for inserting a packet pointer in a packet queue control system, comprising:
   (a) means for determining if a pointer is a first type or a second type;
   (b) if the pointer is the first type, means for determining if an overall tail is the first type or the second type;
      if the overall tail is the second type, a means for setting an overall tail flag to a first state, and a means for setting an entry to the first state;
      a means for getting a first type tail;
      a means for linking the pointer in a first data structure embodied on a tangible computer readable medium to the first type tail; and
      a means for setting the first type tail to the pointer; and
   (c) if the pointer is the second type, a means for determining if the overall tail is the first type or the second type;
      if the overall tail is the second type, a means for adding the pointer to a field of a second data structure embodied on a tangible computer readable medium with a second state;
      if the overall tail is the first type, a means for adding the pointer to a field of the second data structure with the first state; and
      a means for setting the overall tail flag to the second state;
   wherein the first data structure includes a plurality of linked-list data structures;
   wherein a third data structure embodied on a tangible computer readable medium is coupled to the second data structure and is configured to store a plurality of status flags;
   wherein the plurality of status flags include:
      a first type packet pointer head position indication;
      a first type racket pointer tail Position indication;
      an overall head pointer indication; and
      an overall tail pointer indication.
18. A method of scheduling a packet pointer, comprising:
   (a) determining if an overall head is a first type or a second type;

(b) if the overall head is the first type:
   getting a first type head;
   getting a first type pointer from a second data structure;
   determining if the first type head matches the first type pointer;
   if a match, setting an overall head flag to a second state; and
   updating the first type head with a next pointer from a first data structure; and
(c) if the overall head is the second type:
   getting a second type pointer from the second data structure;
   determining if a field in the second data structure is a first state or the second state;
   if the first state, setting the overall head flag to the first state; and
   removing a head entry from the second data structure;
wherein the first data structure includes a plurality of linked-list data structures;
wherein a third data structure is coupled to the second data structure and is configured to store a plurality of status flags;
wherein the plurality of status flags include:
   a first type packet pointer head position indication;
   a first type packet pointer tail position indication;
   an overall head pointer indication; and
   an overall tail pointer indication.

19. The method of scheduling the packet pointer of claim 18, wherein:
   the second data structure includes a first-in first-out (FIFO) data structure.

20. The method of scheduling the packet pointer of claim 18, wherein:
   the first type pointer includes a unicast packet pointer; and
   the second type pointer includes a multicast packet pointer.

21. The method of scheduling the packet pointer of claim 18, wherein:
   the first state includes a yes-state; and
   the second state includes a no-state.

22. The method of scheduling the packet pointer of claim 18, wherein:
   the first data structure is accessed at most once; and
   the second data structure is accessed at most once.

23. A means for scheduling a packet pointer, comprising:
(a) a means for determining if an overall head is a first type or a second type;
(b) if the overall head is the first type:
   a means for getting a first type head;
   a means for getting a first type pointer from a second data structure;
   a means for determining if the first type head matches the first type pointer;
   if a match, a means for setting an overall head flag to a second state; and
   a means for updating the first type head with a next pointer from a first data structure; and
(c) if the overall head is the second type:
   a means for getting a second type pointer from the second data structure;
   a means for determining if a field in the second data structure is a first state or the second state;
   if the first state, a means for setting the overall head flag to the first state; and
   a means for removing a head entry from the second data structure;
wherein the first data structure includes a plurality of linked-list data structures;
wherein a third data structure is coupled to the second data structure and is configured to store a plurality of status flags;
wherein the plurality of status flags include:
   a first type packet pointer head position indication;
   a first type packet pointer tail position indication;
   an overall head pointer indication; and
   an overall tail pointer indication.

24. A method of managing packet pointers, comprising:
inserting a packet pointer according to the method of claim 15; and
scheduling the packet pointer comprising:
(a) determining if an overall head is a first type or a second type;
(b) if the overall head is the first type:
   getting a first type head;
   getting a first type pointer from a second data structure;
   determining if the first type head matches the first type pointer;
   if a match, setting an overall head flag to a second state; and
   updating the first type head with a next pointer from the first data structure; and
(c) if the overall head is the second type:
   getting a second type pointer from the second data structure;
   determining if a field in the second data structure is a first state or the second state;
   if the first state, setting the overall head flag to the first state; and
   removing a head entry from the second data structure;
   wherein the inserting the packet pointer and the scheduling the packet pointer include using a data arrangement for packet transmit queue control, comprising:
   the first data structure configured to store a plurality of first type packet pointers;
   the second data structure configured to store a plurality of second type packet pointers; and
   a third data structure coupled to the second data structure and configured to store a plurality of status flags;
   wherein the plurality of status flags include:
      a first type packet pointer bead position indication;
      a first type packet pointer tail position indication;
      an overall head pointer indication; and
      an overall tail pointer indication.

25. The method of managing packet pointers of claim 24, wherein:
the inserting the packet pointer and the scheduling the packet pointer are operable in a system, comprising:
the first data structure coupled to a packet controller and configured to store the plurality of first type packet pointers;
the second data structure coupled to the packet controller and configured to store the plurality of second type packet pointers, wherein the packet controller is configured to receive a first sequence of packet pointers and to provide each packet pointer to one of the first and second data structures; and
a port transmit controller coupled to the first and second data structures and configured to provide a second sequence of packet pointers.

26. The packet transmit queue control system of claim 1, wherein:
the port transmit controller is coupled to an output port.

27. The packet transmit queue control system of claim 3, wherein:
each of the plurality of FIFO structures are coupled with a corresponding set of output port status flags.

* * * * *

UNITED STATES PATENT AND TRADEMARK OFFICE
CERTIFICATE OF CORRECTION

PATENT NO. : 7,586,911 B2  Page 1 of 1
APPLICATION NO. : 10/687786
DATED : September 8, 2009
INVENTOR(S) : Lien et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1696 days.

Signed and Sealed this

Twenty-first Day of September, 2010

David J. Kappos
*Director of the United States Patent and Trademark Office*